Sept. 11, 1951  G. B. DAVIS, JR  2,567,187
COFFEE MAKER
Filed Sept. 7, 1945  3 Sheets-Sheet 2
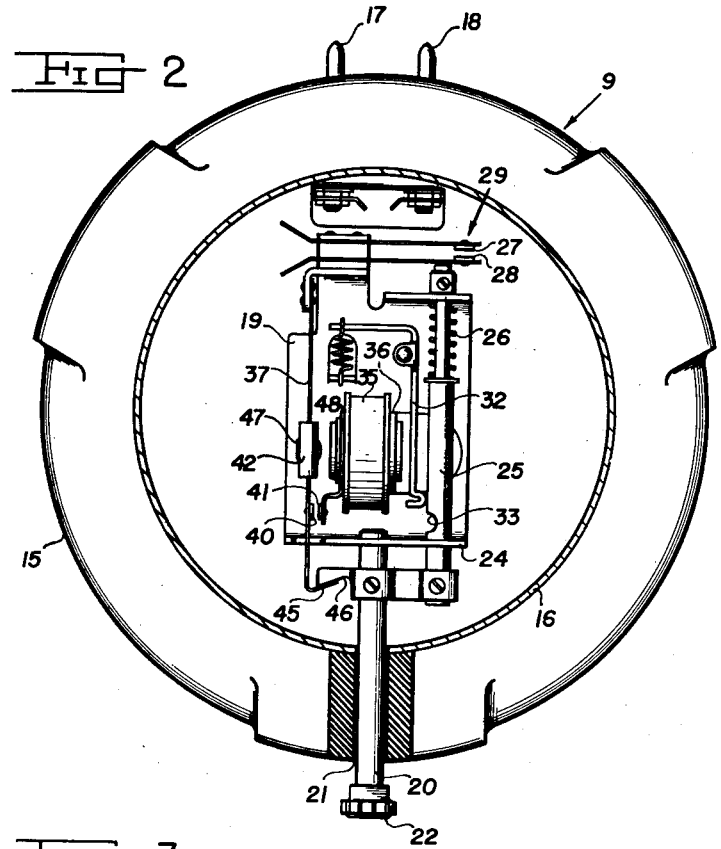
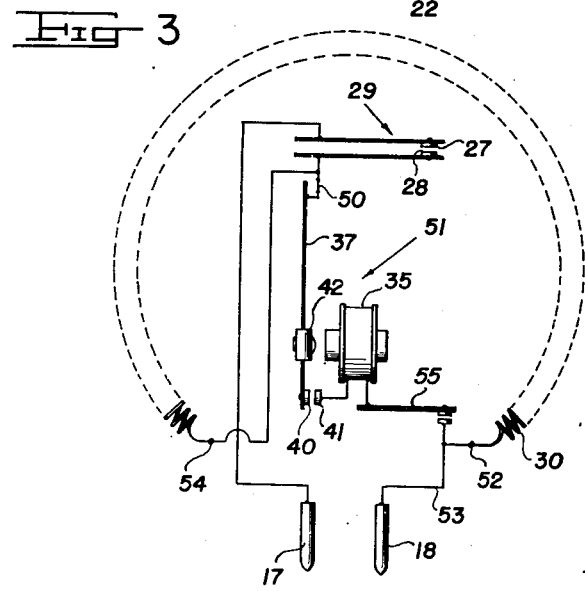
Inventor
George B. Davis Jr.

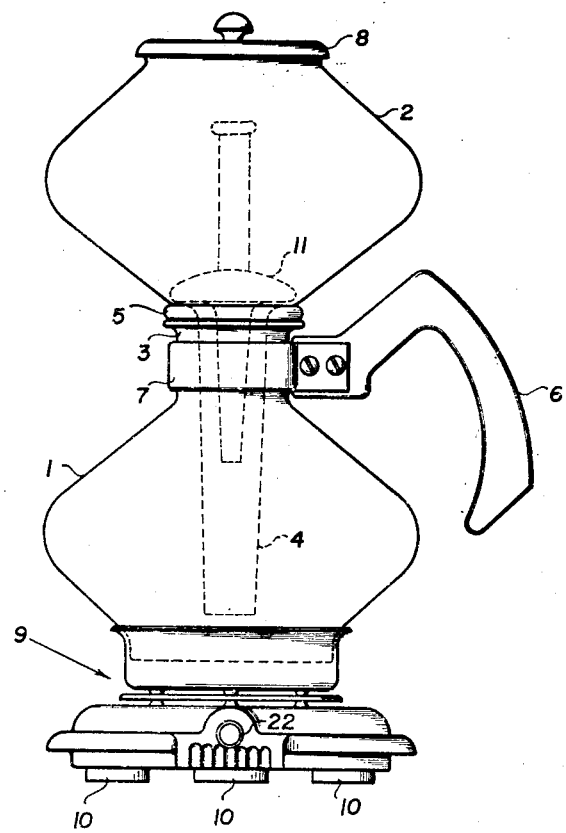

Sept. 11, 1951  G. B. DAVIS, JR  2,567,187
COFFEE MAKER
Filed Sept. 7, 1945  3 Sheets-Sheet 3
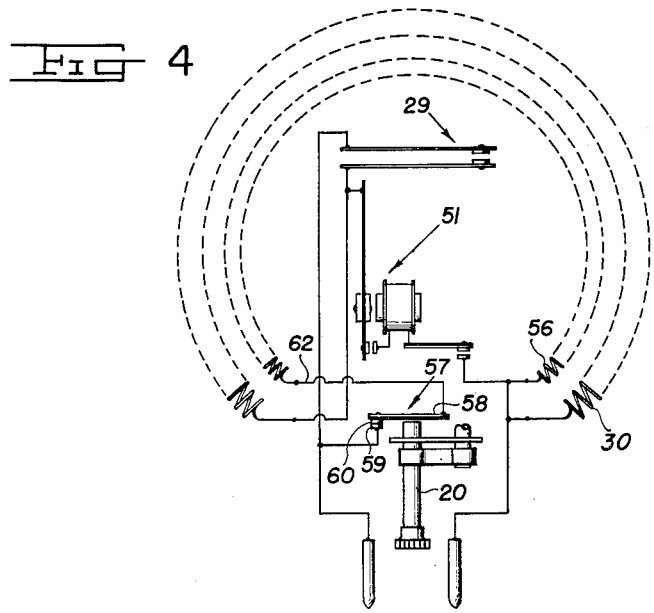
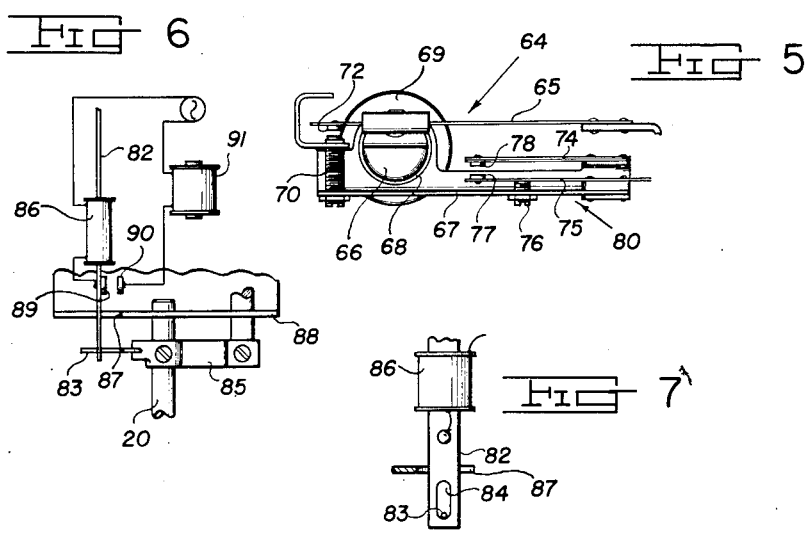
Inventor
George B. Davis Jr.

Patented Sept. 11, 1951

2,567,187

UNITED STATES PATENT OFFICE 2,567,187

COFFEE MAKER

George B. Davis, Jr., Green Acres, Md.

Application September 7, 1945, Serial No. 614,917

5 Claims. (Cl. 99—281)

This invention relates to a coffee maker and more specifically to an automatic coffee maker of the vacuum type and is a continuation-in-part of application No. 542,117, which issued as Patent No. 2,385,694, dated September 25, 1945.

These coffee makers are provided with coffee steeping and water heating vessels which are in liquid communication with each other.

In coffee makers of this type, it is the usual practice to cut off the heat manually as soon as the water has been transferred from the water heating receptacle to the steeping receptacle. This invention has as one of its objects the provision of an improved control for the type of coffee maker described which renders it completely automatic after the heat has been turned on.

Heretofore, beverage brewers and coffee makers of this type have found considerable favor with the people, but frequently, due to inattention, the user does not promptly shut off the power supplying heat to the device, thereby permitting the lower chamber to run dry. Various methods have been employed to overcome this disadvantage, one of which utilizes the shifting weight caused by the liquid being transferred from one vessel to the other; another provides a thermal control for fitting to or in the upper bowl to be actuated by the presence of the heated liquid forced into this upper container. Most methods depend for their functioning upon specially constructed containers and fittings adapted specifically to their particular control.

It is desired by this invention to provide a coffee maker having a control mechanism responsive to the vibrations present in all such cookers during the last part of the brewing operation and to utilize these vibrating impulses to operate a control for reducing the heat to cause the brew to return to the water heating vessel at the completion of the cooking cycle.

It is also desired here to provide a manually or automatically functional control for the purpose described which may be completely concealed in a base support and adaptable for use with any standard coffee maker of the type designated and which will function consistently irrespective of the quantity or temperature of the liquid used.

Another object of this invention is to provide means for maintaining the brew at a predetermined temperature after the completion of the cooking process.

In order that this invention may be more readily understood, reference is made to the accompanying drawings:

Fig. 1 is a plan view of the invention.

Fig. 2 is a section through the support showing a plan view of the control.

Fig. 3 is a circuit diagram of the invention.

Fig. 4 is an alternate circuit diagram of the invention.

Fig. 5 is an alternate structure of the vibrating control assembly.

Fig. 6 is an alternate method of securing the vibrative arm against movement when not in operation.

Fig. 7 is a side view of Fig. 6.

In reference to Fig. 1, this invention is shown as applied to a coffee maker comprising a lower water heating vessel or bowl 1 and an upper coffee infusion or steeping vessel or bowl 2. The lower bowl is provided at its upper portion with an upright neck 3 within which depends the tubular extension 4 which is attached to the lower portion of the upper bowl. This extension or tube constitutes a liquid passageway placing the said bowls 1 and 2 in liquid communication.

A suitable gasket or stopper 5, preferably formed of rubber, is inserted in the neck 3 of the lower bowl and is provided with a centrally arranged aperture to receive the extension 4 provided on the upper bowl. The handle 6 is secured to the lower bowl by strap portion 7 which surrounds and grips the neck 3 of this bowl as shown. The upper bowl is normally covered by a suitable cover member 8. The support or stand 9 houses a suitable electric heating element and mechanism for controlling the current to the element. The feet 10 are preferably of rubber or some other yielding material to give the vessel support a resiliency to a stationary resting surface upon which it may be set.

In the operation of this apparatus, thus far described, it will be understood that coffee grounds will be placed in the infusion receptacle 2 above the filter 11 and that a suitable quantity of water will be placed in the lower bowl 1, heat will then be applied by the heating element. As the water in the lower bowl is heated, a pressure is generated sufficiently great to cause the water in the lower bowl to be forced up through the tube 4 and by or through the filter 11 into the upper bowl 2 where the coffee grounds are placed. As long as heat is applied to the lower bowl, the water will continue to flow up into the upper bowl until all of the water in the lower bowl, above the level of the lower end of the tube 4, has risen to the upper bowl. The water will remain in the upper bowl to infuse the coffee until the heat is cut off, this permits the lower bowl to cool allowing the water vapor in the lower bowl to condense and thereby reduce the pressure therein sufficiently to cause the coffee brew in the upper bowl to flow down into the lower bowl through the coffee grounds and filter 11 by atmospheric pressure and gravity. After the coffee has been made, the upper bowl may be removed and the coffee brew poured from the lower bowl by means of the handle.

In referring to Fig. 2 and its respective circuit diagram Fig. 3, the plastic ring 15, forming the lower portion of the support 9, is shown in elevation with the housing 16 cut in section disclosing a plan of the invention normally concealed therein. Current is supplied to the mechanism through terminal pins 17 and 18 which are arranged to receive the usual supply plug of an ordinary supply cord. The mounting plate 19 is positioned so that the operating pin 20 will extend beyond the outer surface of the housing through opening 21 with clearance for the knob 22 to move inward from its "inoperative" or "out" position to its "operative" or "in" position. This pin is slidably fitted in an aperture formed in the flange 24 of the mounting plate and rigidly linked with the plunger 25 so that when manually forced inward the plunger is likewise operated to compress the return spring 26 at the same time pressing together the spring mounted contacts 27 and 28 of the control 29 for closing the circuit through the heating element 30. The plunger is retained in this "operative" position by the spring loaded latch arm 32 connecting with the notch 33 formed in the associate side of the plunger as shown. This type of latch will permit the plunger to be withdrawn manually when desired. The electromagnet 35 is supported in the ear 36, pressed from the plate, and so positioned that when energized will magnetically attract the latch arm 32 acting as a metallic armature adapted to be attracted by magnet 35 for releasing the plunger 25 to automatically operate the control 29. A vibrative circuit closer comprises a vibrative member or arm 37 that is rigidly secured to a flange of the plate and positioned so that when the free end is sufficiently vibrated the floating contact 40 will swing into engagement with the stationary contact 41. The electromagnet 35, when energized, will magnetically attract the weight 42 for retarding further vibration of the arm 37 to hold these said contacts 40 and 41 together. The free end of the vibrative arm is formed into a hook 45, as shown, for coupling with the lug 46 formed on the link. As the pin 20 is caused to move to its "out" position, the lug will connect with the hook for drawing the vibrative arm tight preventing unnecessary movement of this member until the pin is again pressed inward to its "operative" position. The rivet 47 for securing the weight 42 is formed preferably of some non-magnetic metal to act as a spacer to prevent the weight from freezing to the core of the magnet should it become, to any degree, permanently magnetized. The stationary contact 41 is mounted on the collar 48 that is fitted over, but insulated from, the magnet core by insulating washers. The fuse strip 50 is suitably positioned in the circuit to permit the use of a low resistance electromagnet for operating the latch 32. This fuse strip would operate to open the circuit through the magnet should some malfunction occur in the operation of the vibrative control 51.

To set in operation the apparatus thus far described, the pin 20 of the control is manually forced inward. This action causes the plunger 25 to compress the spring 26 until the latch 32 has engaged the notch 33 to lock the said plunger in its "operative" or "in" position. This inward movement of the plunger forces the spring mounted contact 28 into circuit closing engagement with the contact 27 permitting current flowing in through the contact pin 17 to pass on to the terminal 54 of the main heating element 30. The other terminal 52 of the heater connects directly with the other contact pin 18 through lead 53 completing the circuit through the element causing it to heat. The hot element boils the water in the aforementioned water heating vessel, and, as formerly explained, causes the greater portion of this heated water to be forced from the lower vessel into the upper or steeping vessel by the internal pressure generated within the lower vessel. It is at this time, after the water has been transferred, that the escaping gases, still being generated within the heating vessel, force an escape into the suspended liquid in the steeping vessel causing a turbulence in the mass of liquid which shakes and bounces the vessels sufficiently to set up a vibration in the resilient contact arm 37. This arm, that has been set in motion, gradually picks up these vibrations set up by the boiling liquid and, in a short time, develops sufficient momentum as to cause the resiliently mounted contact 40, in its swinging arc, to connect with the contact 41 for closing the circuit through the electromagnet 35. This magnet, on being energized, magnetically attracts the weight 42 on the arm to stop further vibration and holds the contacts 40 and 41 together until the latch arm 32, also attracted to the magnet, has had time to become disengaged from the notch 33 for releasing the plunger 25. This plunger, on being released, snaps to its "out" position operating the control 29 to interrupt the supply of current to the heating element 30. The control also breaks the circuit through the electromagnet 35 which, on being deenergized, releases the arm 37 and the latch 32 to complete the brewing cycle. The thermal strip 55 is not required for a normal functioning of the device but is desirably connected in the parallel circuit to act as a safety to hold the circuit open until sufficiently heated by the element 36. The advantage of this thermally responsive circuit breaker is that, any premature jolting or shaking during the placing or setting up of the coffee maker will not affect the control until after this thermal strip has been heated to a predetermined degree, which is set to take place only during the latter stages of the coffee brewing process, that is, when the water nears the boiling point, for at that time it is very unusual for the coffee maker to be disturbed.

Fig 4 shows an alternate circuit diagram of the invention including an auxiliary element 56 and a control 57 for applying a warming heat to the water heating vessel after the main or water boiling element 30 has been cut off by the operation of control 29. The vibrative control 51 and its respective circuit is the same as heretofore described and shown in Fig. 3. The thermal strip 58 is to be suitably located for being forced out of engagement with the stationary contact 59 by the pin 20 when the latter is pressed inward for operating the control 29. During the operation of the main element 30, the thermal strip will take on heat to assume a normal open circuit position. At the completion of the brewing cycle, the pin 20 is automatically released to move back away from the strip allowing it, as it cools, to bring together contacts 59 and 60 for connecting in circuit the auxiliary element 56. This element acts to apply a warming heat to the water heating vessel without raising the temperature of the fluid therein to the degree of driving it again into the steeping vessel. The strip 58 does not necessarily have to be a bimetal strip but may be in the form of an ordinary spring switch arm operated as described. This structure would, however, allow no cooling time or lag between the automatic operation of the control 29 and the connecting of the auxiliary element 56 and would greatly slow down the return of the brew from the steeping vessel to the heating vessel. It is also understood that the thermal strip 58 does not necessarily have to be pressed out of circuit by the pin 20, at the time of the setting of the control, but will act, for a short time, to connect in parallel with the main element 30 the auxiliary element 56 until the said strip has become heated to the extent of opening the circuit by separating the contacts 59 and 60. It will again close the circuit through the auxiliary element 56 after the completion of the brewing process and after the main element has cooled to a predetermined degree.

Fig. 5 shows the alternate vibrative control 64 with the arm 65 positioned to move laterally across the face of the magnet 66. The mounting plate 67 fits over the core of the magnet but is insulated therefrom by the insulating washers 68 and 69. The adjustable contact 70 is shown threaded through the flanges formed on the mount and positioned for connecting with the floating contact 72 of the arm 65 when the latter is properly vibrated. The thermal responsive strip 74 is positioned for bending down to connect with the spring mounted contact 75 when the former is heated to a predetermined degree. The set screw 76 is threaded into the lower flange of the plate and operates to regulate the space between the contact 77 and 78 of the thermal control 80. The purpose of this thermal control has heretofore been discussed in describing Fig. 3.

Figs. 6 and 7 show an alternate method for securing the vibrative arm 82 against movement until such movement is desired for the automatic operation of the device as heretofore described. The spring finger 83, as shown in Fig. 7, is positioned to move longitudinally in the slot 84 formed in the free end of the arm 82 and so connected with the operating pin 20 that when the latter is manually forced inward, the spring is moved back through the slotway to free the arm for vibrating. As the pin is automatically or manually released from its "in" or "operative" position, the spring finger 83 is carried back with the link 85 to engage the end of the slot 84, as shown in Fig. 7, for drawing the arm 82 tight to stop further vibration and secure it against unnecessary movement. The alternate circuit for the vibrative control as shown here provides for a separate electromagnet 86 to control the movement of the vibrative member or arm 82. This magnet is so positioned on the arm as to substitute for the weight as shown in the foregoing figures. The electromagnet 86 acts to magnetically energize the arm for causing it to be drawn to the shoulder 87 of the flange 88 for holding contacts 89 and 90 together until the electromagnet 91, also in the circuit, has acted to operate the heater control as heretofore described. The electromagnet 86 is effective to cause the arm 82 to move to and stick on shoulder 87 when the vibrations of arm 82 bring it in close proximity to shoulder 87. The only advantage of a separate magnet for controlling the movement of the arm is that the vibrative element can be located separately from the electromagnet 91 that is positioned for operating the heater control.

It is understood that various other modifications in construction and assembly may be resorted to without departing from the spirit and scope of this invention. What I claim for this invention and desire to secure by Letters Patent is:

1. A coffee maker comprising a first vessel for heating water, a second vessel for infusing coffee, a liquid transfer tube connecting said vessels, a support for said vessels, a primary electric heating element and an auxiliary electric heating element respectively mounted in said support, an energizing circuit for each of the heating elements, a primary control switch arranged in the circuit for the primary heating element, a second switch arranged in the circuit for the auxiliary heating element, a switch operating member common to both of said switches for closing the primary control switch and opening the second switch in a single operation, a vibrative circuit closer, latch means operatively engageable with the primary control switch for releasably retaining the latter closed and the second switch open, electromagnetic means arranged in the circuit for the primary electric heating element for stopping vibrations of the vibrative circuit closer, and said latch means including a latch arm serving as an armature adapted to be attracted by the electromagnetic means for releasing the primary control switch and the switch operating member for movement of the primary control switch to open position and movement of the second switch to closed position.

2. In a vacuum-type coffee maker embodying a resiliently mounted support, a primary electric heating element and an auxiliary electric heating element respectively mounted in said support, an energizing circuit for each of the heating elements, a primary control switch arranged in the circuit for the primary heating element, a second switch arranged in the circuit for the auxiliary heating element, a switch operating member common to both of said switches for closing the primary control switch and opening the second switch in a single operation, a vibrative circuit closer, latch means operatively engageable with the primary control switch for releasably retaining the latter closed and the second switch open, electromagnetic means arranged in the circuit for the primary electric heating element for stopping vibrations of the vibrative circuit closer, and said latch means including a latch arm serving as an armature adapted to be attracted by the electromagnetic means for releasing the primary control switch and the switch operating member for movement of the primary control switch to open position and movement of the second switch to closed position.

3. In a coffee maker of the vacuum type embodying an electric heater, a control for said heater comprising a control switch arranged in circuit therewith, a vibrative circuit closer, latch means operatively engageable with the control switch for releasably securing the latter in an "on" position, electromagnetic means arranged in the circuit for stopping vibrations of the vibrative circuit closer, and said latch means including a part serving as an armature adapted to be attracted by the electromagnetic means when the vibrative circuit closer is in closed position for effecting release of the control switch for movement of the latter to "off" position.

4. In a coffee maker of the vacuum type embodying an electric heater, a control for said heater comprising a control switch arranged in circuit therewith, an electromagnet arranged in said circuit, a vibrative circuit closer responsive to vibratory action of the coffee maker for closing the circuit through the magnet and including an armature adapted to be attracted by the magnet for holding the vibrative circuit closer in a circuit closing position, and latch means operatively engageable with the control switch for releasably retaining the latter in an "on" position including a latch arm adapted to be attracted by the energized electromagnet for releasing the control switch for movement of the latter to an "off" position.

5. In a coffee maker of the vacuum type embodying an electric heater, a control for said heater comprising a control switch arranged in circuit therewith and having an "on" position and an "off" position, an electromagnet arranged in the circuit, a thermo responsive switch connected in the circuit between the magnet and the heater and responsive to heat generated by the heater to move to closed position, a vibrative circuit closer arranged in the circuit and movable to circuit closing position in response to vibratory action of the coffee maker and including an armature adapted to be attracted by the electromagnet to stop vibrations of the vibrative circuit closer when in closed position, and latch means engageable with the control switch when the latter is in "on" position for releasably retaining said switch in said position and including a part serving as an armature adapted to be attracted by the electromagnet when the vibrative circuit closer is in closed position for effecting release of the control switch for movement of the latter to "off" position, thereby opening the circuit through the heater and electromagnet.

GEORGE B. DAVIS, Jr.

REFERENCES CITED

The following references are of record in the file of this patent:

UNITED STATES PATENTS

| Number | Name | Date |
| --- | --- | --- |
| 1,063,369 | McElroy | June 3, 1913 |
| 2,194,859 | Malmquist et al. | Mar. 26, 1940 |
| 2,287,583 | Weeks | June 23, 1942 |
| 2,363,169 | Lischer | Nov. 21, 1944 |
| 2,385,694 | Davis | Sept. 25, 1945 |
| 2,402,163 | Huenergardt | June 18, 1946 |
| 2,402,576 | Purpura | June 25, 1946 |